(12) United States Patent
Yu et al.

(10) Patent No.: US 10,698,638 B2
(45) Date of Patent: Jun. 30, 2020

(54) DATA TRANSMISSION METHOD AND HOST SYSTEM USING THE SAME

(71) Applicant: Wiwynn Corporation, New Taipei (TW)

(72) Inventors: Pei-Ling Yu, New Taipei (TW); Chia-Liang Hsu, New Taipei (TW); Bing-Kun Syu, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 51 days.

(21) Appl. No.: 15/992,150

(22) Filed: May 29, 2018

(65) Prior Publication Data
US 2019/0303046 A1    Oct. 3, 2019

(30) Foreign Application Priority Data

Mar. 27, 2018 (TW) .............................. 107110443 A

(51) Int. Cl.
*G06F 3/06* (2006.01)
*G06F 9/455* (2018.01)

(52) U.S. Cl.
CPC .......... *G06F 3/0664* (2013.01); *G06F 3/0679* (2013.01); *G06F 9/45558* (2013.01); *G06F 2009/45595* (2013.01)

(58) Field of Classification Search
CPC ... G06F 9/455; G06F 3/06; G06F 2009/45595
USPC ............................................................ 710/1
See application file for complete search history.

(56) References Cited

U.S. PATENT DOCUMENTS

| 7,624,156 | B1* | 11/2009 | Hefty ................... H04L 49/358 370/232 |
| 9,986,028 | B2 | 5/2018 | Cayton et al. |
| 2006/0075057 | A1* | 4/2006 | Gildea ................ H04L 67/1097 709/212 |
| 2007/0162641 | A1* | 7/2007 | Oztaskin ................. G06F 13/28 710/22 |
| 2010/0064070 | A1* | 3/2010 | Yoshimura ............ G06F 13/128 710/22 |
| 2015/0012607 | A1 | 1/2015 | Cayton et al. |
| 2017/0034268 | A1* | 2/2017 | Govind ............... H04L 67/1097 |

(Continued)

FOREIGN PATENT DOCUMENTS

CN     104283938     1/2015

OTHER PUBLICATIONS

"Office Action of Taiwan Counterpart Application", dated Dec. 7, 2018, p. 1-p. 6.

*Primary Examiner* — Christopher B Shin
(74) *Attorney, Agent, or Firm* — JCIPRNET

(57) ABSTRACT

A data transmission method for transmitting first data to a plurality of physical remote target devices by a host system is provided. The method includes: generating a transmission instruction to transmit the first data to a network interface controller of the host system; transforming the first data into a plurality of second data and respectively recording the plurality of second data in a plurality of memory addresses of a memory of the network interface controller; and instructing the plurality of physical remote target devices to acquire the plurality of second data respectively from the plurality of memory addresses of the memory. In addition, a host system using the data transmission method is also provided.

16 Claims, 4 Drawing Sheets

(56) References Cited

U.S. PATENT DOCUMENTS

| | | | |
|---|---|---|---|
| 2018/0341429 A1* | 11/2018 | Bolkhovitin | G06F 3/0659 |
| 2018/0341547 A1* | 11/2018 | Bolkhovitin | G06F 11/1068 |
| 2019/0065433 A1* | 2/2019 | Voigt | G06F 15/173 |
| 2019/0102250 A1* | 4/2019 | O'Krafka | G06F 11/1068 |
| 2019/0102287 A1* | 4/2019 | Cayton | H04L 67/1097 |

\* cited by examiner

DATA TRANSMISSION METHOD AND HOST SYSTEM USING THE SAME

CROSS-REFERENCE TO RELATED APPLICATION

This application claims the priority benefit of Taiwan application serial no. 107110443, filed on Mar. 27, 2018. The entirety of the above-mentioned patent application is hereby incorporated by reference herein and made a part of this specification.

BACKGROUND

Field of the Invention

The disclosure relates to a data transmission method and a host system using the same.

Description of Related Art

Along with technologies being developed and invented, calculation, storage and networking has become the core of the fundamental architecture in the modern information technology field. Flash memories, new generation phase change memories (PCMs) and solid state disks (SSDs) for solid state storage are widely used in data processing systems, and through a non-volatile memory express (NVMe) protocol, NVMe protocol-based SSDs can be shared or distributed to a plurality of computation servers, thereby achieving advantages, such as high performance, less delay and low protocol burden.

In addition, by utilizing, an NVMe over fabrics (NVMeoF) technique, the advantages of high performance, less delay and low protocol burden provided by the NVMe protocol in the era of single system can be further well taken in interconnection structure of NVMe storage systems. Through the NVMeoF technique, the computation servers can be connected to remote just a bunch of flash (JBOF) through a network and also have the advantages of high performance, less delay and low protocol burden. However, the current technique only allows data to be transmitted to the JBOF of one destination in one transmission, and thus, if there are demands, such as remote backup, the data has to be repeatedly transmitted for many times, which lacks efficiency.

SUMMARY

Accordingly, the embodiments of the disclosure provide a data transmission method and a host system using the same, which can achieve efficiently transmitting data to a plurality of remote destinations.

According to an embodiment of the disclosure, a data transmission method for transmitting first data to a plurality of physical remote target devices by a host system is provided. The method includes: generating a transmission instruction to transmit the first data to a network interface controller of the host system; transforming the first data into a plurality of second data and respectively recording the plurality of second data in a plurality of memory addresses of a memory of the network interface controller; and instructing the plurality of physical remote target devices to acquire the plurality of second data respectively from the plurality of memory addresses of the memory.

In some embodiments, the transmission instruction is configured to transmit data to one single remote target device, wherein the remote target device includes the physical remote target device or a virtual remote target device.

In some embodiments, before the step of generating the transmission instruction to transmit the first data to the network interface controller of the host system, the data transmission method further includes: virtualizing the network interface controller as the virtual remote target device.

In some embodiments, the step of virtualizing the network interface controller as the virtual remote target device includes: virtualizing the network interface controller as the virtual remote target device by a programmable unit on the network interface controller; and reporting by the programmable unit that the network interface controller is connected to one single remote target device.

In some embodiments, the programmable unit is configured to set an amount of the plurality of second data.

In some embodiments, the step of transforming the first data into the plurality of second data includes: replicating the first data into the plurality of second data, such that each of the second data is identical to the first data.

In some embodiments, the step of transforming the first data into the plurality of second data includes: splitting the first data into the plurality of second data, wherein each of the second data is different from the first data.

In some embodiments, the network interface controller supports a remote direct memory access (RDMA) technique.

In some embodiments, the network interface controller is connected to the plurality of physical remote target devices through a network and via a non-volatile memory express (NVMe) over Fabrics technique.

In some embodiments, each of the remote target devices is an NVMe storage device.

In another aspect, according to an embodiment of the disclosure, a host system for transmitting first data to a plurality of physical remote target devices including a network interface controller and a processor coupled to the network interface controller is provided. The network interface controller is connected to the plurality of physical remote target devices through a network and includes a memory. The processor is configured to generate a transmission instruction to transmit the first data to the network interface controller. The network interface controller is configured to: transform the first data into a plurality of second data and respectively record the plurality of second data in a plurality of memory addresses of the memory; and instruct the plurality of physical remote target devices to acquire the plurality of second data respectively from the plurality of memory addresses of the memory.

In some embodiments, the transmission instruction is configured to transmit data to one single remote target device, wherein the remote target device includes the physical remote target device or a virtual remote target device.

In some embodiments, the network interface controller is further configured to be virtualized as the virtual remote target device.

In some embodiments, the network interface controller includes a programmable unit. The programmable unit is configured to: virtualize the network interface controller as the virtual remote target device; and report to the processor that the network interface controller is connected to one single remote target device.

In some embodiments, the programmable unit is further configured to set an amount of the plurality of second data.

In some embodiments, the operation of the network interface controller transforming the first data into the plurality of second data includes: replicating the first data into the plurality of second data, such that each of the second data is identical to the first data.

In some embodiments, the operation of the network interface controller transforming the first data into the plurality of second data includes: splitting the first data into the plurality of second data, wherein each of the second data is different from the first data.

In some embodiments, the network interface controller supports an RDMA technique.

In some embodiments, the network interface controller is connected to the plurality of physical remote target devices through a network and via an NVMe over Fabrics technique.

In some embodiments, each of the remote target devices is an NVMe storage device.

To sum up, in the data transmission method and the host system using the same provided by the embodiment of the disclosure, when the first data is to be transmitted to a plurality of physical remote target devices, the network interface controller of the host system is first virtualized as the virtual remote target device for receiving the first data to be transmitted, the first data is then replicated or split into the plurality of second data which are recorded in the memory of the network interface controller, and then the plurality of physical remote target devices are instructed to acquire the plurality of second data respectively from the memory of the network interface controller. Accordingly, the data can be efficiently transmitted to a plurality of remote destinations.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
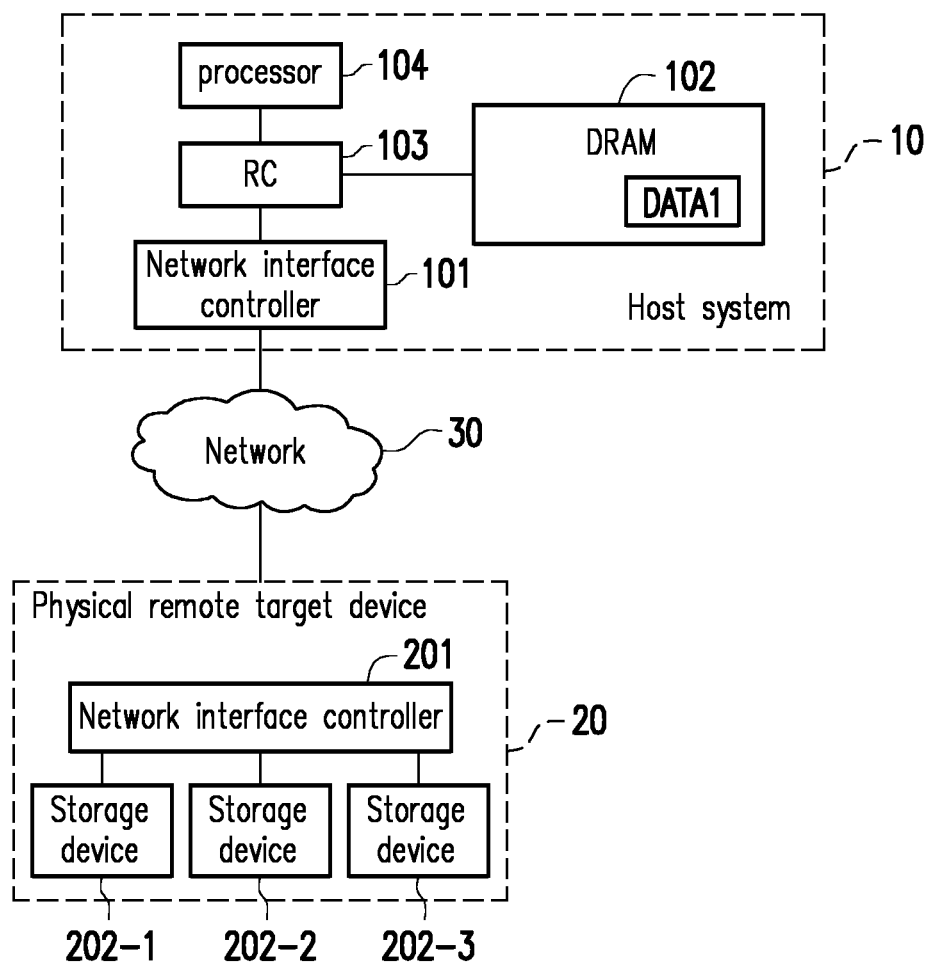
FIG. 1 is a schematic diagram of data transmission through a non-volatile memory express over Fabrics (NVMeoF) technique in the related art.

FIG. 1 is a schematic diagram of data transmission through NVMe over Fabrics in the related art.

Referring to FIG. 1, a host system 10 includes a network interface controller 101, a dynamic random access memory (DRAM) 102, a root complex (RC) 103 and a processor 104. The network interface controller 101, the DRAM 102 and the processor 104 are coupled to the RC 103. The network interface controller 101 is coupled to a network 30 and is a network interface controller supporting a remote direct memory access (RDMA) technique.

A physical remote target device 20 is a non-volatile memory express (NVMe) storage device, for example, a just a bunch of flash (JBOF) system, and includes a network interface controller 201 and a plurality of storage devices 202-1, 202-2 and 202-3 coupled to the network interface controller 201. The network interface controller 201 is coupled to the network 30. The network interface controller 201 is a network interface controller supporting the RDMA technique, and the storage devices 202-1, 202-2 and 202-3 are respectively NVMe protocol-based solid state drives (SSDs).

With the configuration illustrated in FIG. 1, the host system 10 may transmit first data DATA1 via an NVMe over Fabrics (NVMeoF) technique to the physical remote target device 20 through the network 30. However, according to characteristics of the NVMeoF technique, the host system 10 has only one remote destination in one transmission. For example, the processor 104, when issuing a transmission instruction to transmit the first data DATA1 recorded in the DRAM 102, may dictate to transmit the first data DATA1 to one single remote target device (for example, the physical remote target devices 20), without dictating other remote target devices at the same time.

Thus, the host system 10, when having a demand, such as remote backup, to transmit the first data DATA1 to multiple remote destinations, has to repeatedly perform the transmission for multiple times to transmit the first data DATA1 via the NVMeoF technique to the aforementioned multiple remote destinations through the network 30.

Figure 2A:
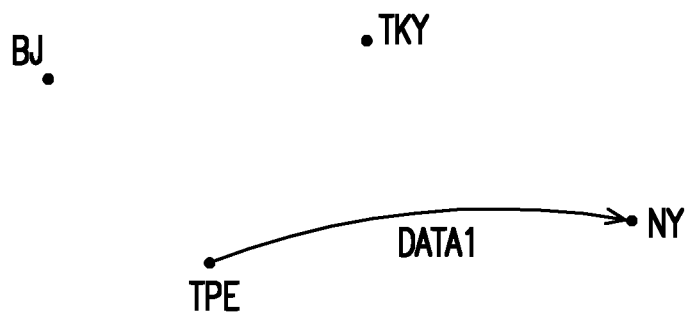
FIG. 2A to FIG. 2C are schematic diagrams illustrating an example that the conventional host system transmits the first data via the NVMeoF technique to a plurality of remote destinations.
Figure 2B:
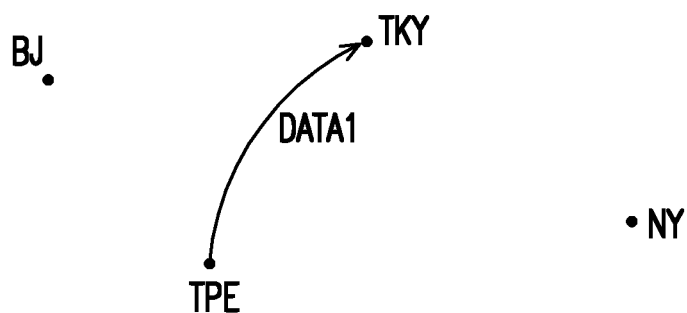
Figure 2C:
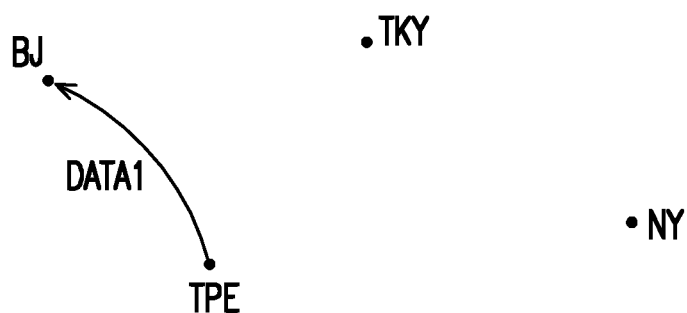

FIG. 2A to FIG. 2C are schematic diagrams illustrating an example that the conventional host system transmits the first data via the NVMeoF technique to a plurality of remote destinations.

Referring to FIG. 2A to FIG. 2C simultaneously, when the host system 10 of a local end TPE is about to backup via the NVMeoF technique to transmit the first data DATA1 to physical remote target devices of a plurality of remote destinations NY, TKY and BJ, it has to repeatedly perform the transmission for three times. Namely, the first data DATA1 is transmitted via the NVMeoF technique to the physical remote target device of the remote destination NY in one transmission, the first data DATA1 is transmitted via the NVMeoF technique to the physical remote target device of the remote destination TKY in another transmission, and the first data DATA1 is transmitted via the NVMeoF technique to the physical remote target device of the remote destination BJ in yet another transmission.

According the example described above, although transmitting data via the NVMeoF technique may benefit in advantages, such as high performance, less delay and low protocol burden, it may suffer from no relevant hardware available for performing data replication once there is a need therefor, which results in reduction of efficiency.

Figure 3:
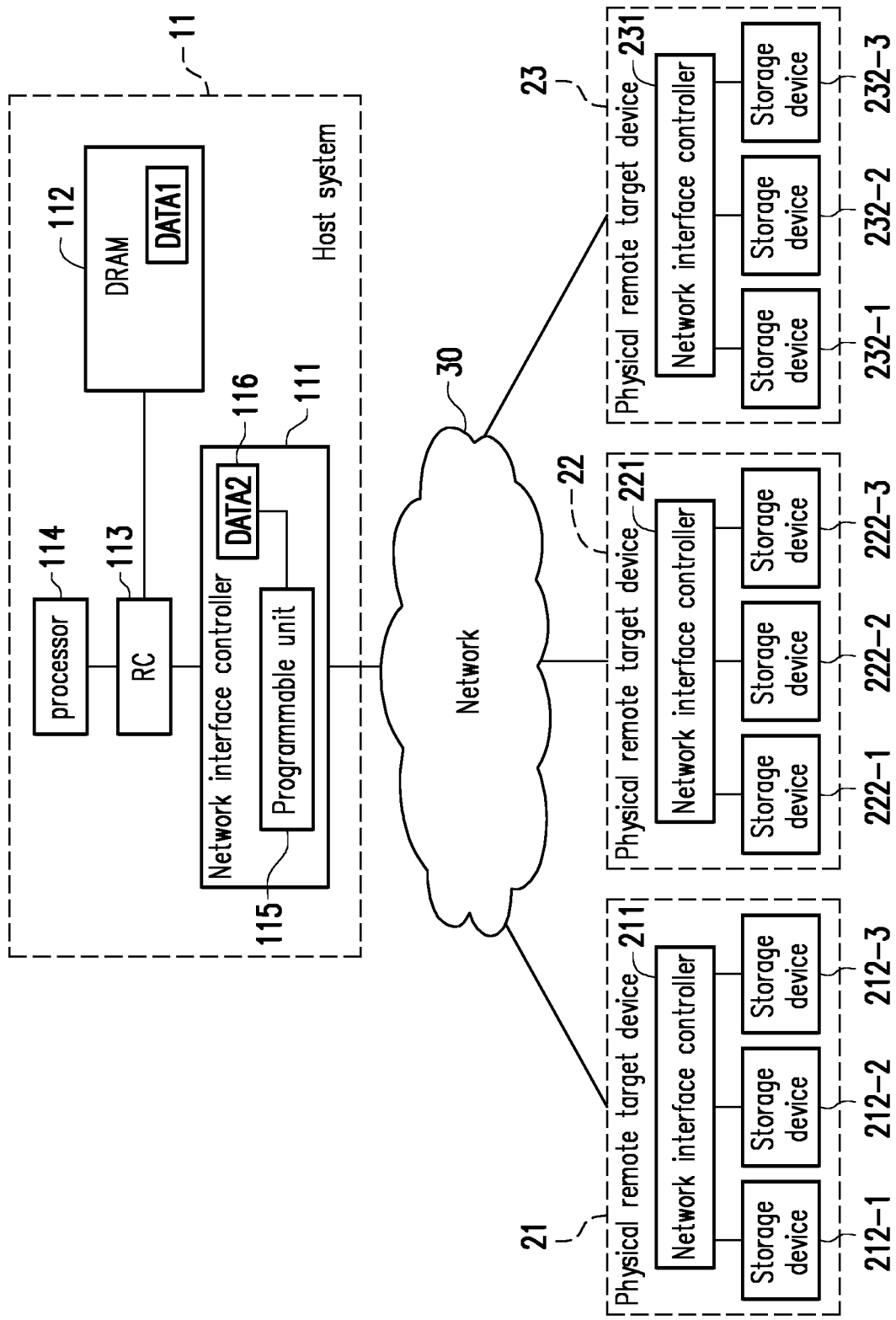
FIG. 3 is a schematic diagram illustrating a data transmission method according to an embodiment of the disclosure.

FIG. 3 is a schematic diagram illustrating a data transmission method according to an embodiment of the disclosure.

Referring to FIG. 3, in the present embodiment, a host system 11 includes a network interface controller 111, a DRAM 112, an RC 113 and a processor 114. The network interface controller 111, the DRAM 112 and the processor 114 are coupled to the RC 103.

The network interface controller 111 is coupled to the network 30 (for example, but not limited to, a fibre channel (FC)) and includes a programmable unit 115 and a memory 116. In some embodiments, the network interface controller 111 is, for example, a network interface controller supporting the RDMA technique, but the disclosure is not limited thereto. In some embodiments, the programmable unit 115 is, for example, a field programmable gate array (FPGA) disposed on the network interface controller 111, but the disclosure is not limited thereto. In some embodiments, the memory 116 is, for example, a random access memory (RAM) disposed on the network interface controller 111, but the disclosure is not limited thereto.

A physical remote target device 21 is, for example, a JBOF system and includes a network interface controller 211 and a plurality of storage devices 212-1, 212-2 and 212-3 coupled to the network interface controller 211. The network interface controller 211 is coupled to the network 30. In some embodiments, the network interface controller 211 is a network interface controller supporting the RDMA technique, while the storage devices 212-1, 212-2 and 212-3 are respectively NVMe protocol-based SSDs, and thus, the physical remote target device 21 is an NVMe storage device, but the disclosure is not limited thereto.

A physical remote target device 22 is, for example, a JBOF system and includes a network interface controller 221 and a plurality of storage devices 222-1, 222-2 and 222-3 coupled to the network interface controller 221. The network interface controller 221 is coupled to the network 30. In some embodiments, the network interface controller 221 is a network interface controller supporting the RDMA technique, while the storage devices 222-1, 222-2 and 222-3 are respectively NVMe protocol-based SSDs, and thus, the physical remote target device 22 is an NVMe storage device, but the disclosure is not limited thereto.

A physical remote target device 23 is, for example, a JBOF system and includes a network interface controller 231 and a plurality of storage devices 232-1, 232-2 and 232-3 coupled to the network interface controller 231. The network interface controller 231 is coupled to the network 30. In some embodiments, the network interface controller 231 is a network interface controller supporting the RDMA technique, while the storage devices 232-1, 232-2 and 232-3 are respectively NVMe protocol-based SSDs, and thus, the physical remote target device 23 is an NVMe storage device, but the disclosure is not limited thereto.

A data transmission method provided by the disclosure will be described below based on the architecture of the embodiment illustrated in FIG. 3. It is to be mentioned that the architecture of the embodiment illustrated in FIG. 3 includes three physical remote target devices 21, 22 and 23, each of which includes three storage devices; however, the number of the physical remote target devices and the number of the storage devices included in each of the physical remote target devices are not limited in the disclosure.

Figure 4:
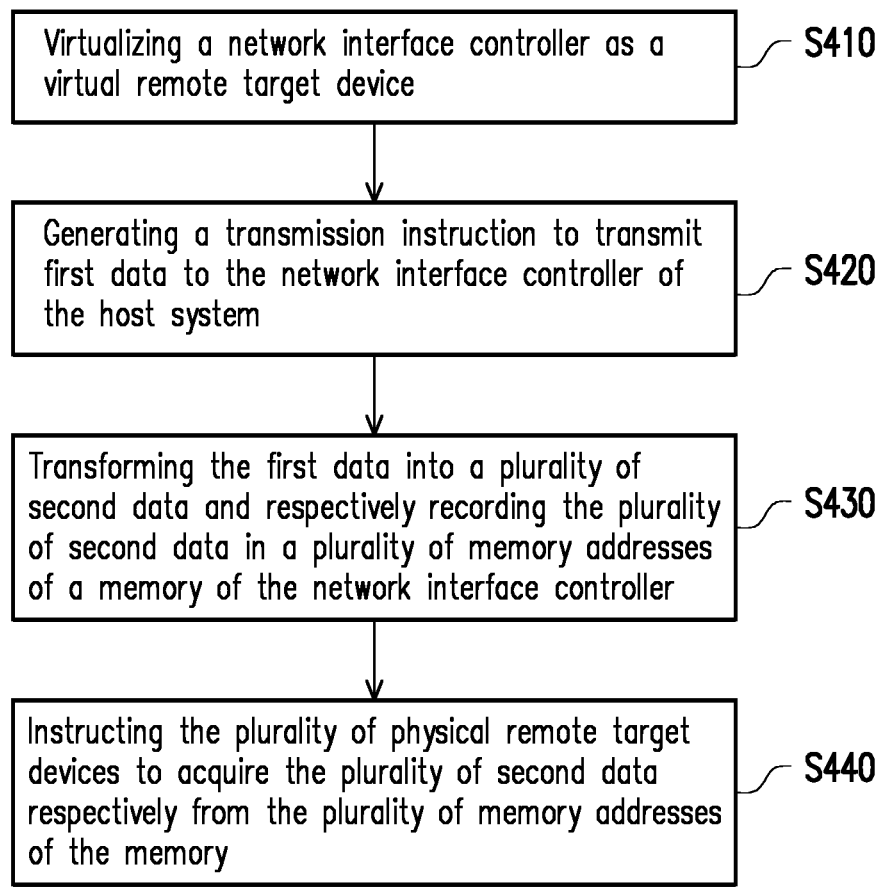
FIG. 4 is a flowchart illustrating a data transmission method according to an embodiment of the disclosure.

FIG. 4 is a flowchart illustrating a data transmission method according to an embodiment of the disclosure.

In the present embodiment, the host system 11 transmits the first data DATA1 via the NVMeoF technique to the plurality of physical remote target devices 21, 22 and 23 through the network 30.

Referring to FIG. 4, in step S410, the network interface controller 111 is virtualized as a virtual remote target device. As described above, according to the characteristics of the NVMeoF technique, the host system 11 is allowed to have only one remote destination in one transmission via the NVMeoF technique. Thus, the programmable unit 115 disposed on the network interface controller 111 virtualizes the network interface controller 111 as a virtual remote target device and reports to the processor 114, thereby notifying the processor 114 that the network interface controller 111 is currently connected to one single remote target device (i.e., the virtual remote target device) through the network.

In step S420, a transmission instruction is generated to transmit the first data DATA1 to a network interface controller 111 of the host system 11. To be detailed, after step 410, the processor 114 may learn that the network interface controller 111 is currently connected to a single remote target device through the network, and thus, the processor 114 may generate and issue the transmission instruction to transmit the first data DATA1 recorded in the DRAM 112 to the remote target device (i.e., the network interface controller virtualized as the virtual remote target device) connected to the network interface controller 111 as the transmission destination.

In step S430, the first data DATA1 is transformed into a plurality of second data DATA2, and the plurality of second data DATA2 are respectively recorded in a plurality of memory addresses of the memory 116 of the network interface controller 111.

In some embodiments, the programmable unit 115 replicates the first data DATA1 into a plurality of second data DATA2 identical to the first data DATA1 and configures a memory address of the memory 116 for storing each of the second data DATA2. For example, the programmable unit 115 may replicate the first data DATA1 into three copies, i.e., second data DATA2-1, second data DATA2-2 and second data DATA2-3, stores the second data DATA2-1 in a first memory address of the memory 116, stores the second data DATA2-2 in a second memory address of the memory 116 and stores the second data DATA2-3 in a third memory address of the memory 116.

In some embodiments, the programmable unit 115 splits the first data DATA1 into a plurality of second data DATA2 different from the first data DATA1 and configures a memory address of the memory 116 for storing each of the second data DATA2. For example, the programmable unit 115 may split the first data DATA1 into the second data DATA2-1, the second data DATA2-2 and the second data DATA2-3, stores the second data DATA2-1 in a first memory address of the memory 116, stores the second data DATA2-2 in a second memory address of the memory 116 and stores the second data DATA2-3 in a third memory address of the memory 116.

It is to be mentioned that in the both examples described above, the first data DATA1 is transformed into the three pieces of second data DATA2, but the disclosure is not limited thereto. Those ordinarily skilled in the art may program the programmable unit 115 based on demands, thereby setting the manner of transforming the first data DATA1 into the plurality of second data DATA2, the number of the plurality of second data DATA2, the memory address of each of the plurality of second data DATA2 and so on. For example, a user may establish a setup environment by using the programmable unit 115 to provide setting interfaces for the transformation manner, the number, the memory addresses, and so on.

In step S440, the plurality of physical remote target devices 21, 22 and 23 are instructed to acquire the plurality of second data DATA2 respectively from the plurality of memory addresses of the memory 116. Specifically, the programmable unit 115, after recording the plurality of second data DATA2 in the plurality of memory addresses of the memory 116 of the network interface controller 111, may transmit the plurality of memory addresses storing the plurality of second data DATA2 to the network interface controllers 211, 221 and 231, such that the network interface controllers 211, 221 and 231 acquires the second data DATA2 respectively from the plurality of memory addresses of the memory 116.

For example, the second data DATA2 includes the second data DATA2-1, the second data DATA2-2 and the second data DATA2-3 which are respectively stored in the first memory address, the second memory address and the third memory address of the memory 116. The programmable unit 115 may, for example, inform the physical remote target device 21 of the first memory address, inform the physical remote target device 22 of the second memory address and inform the physical remote target device 23 of the third memory address. In this way, the network interface controller 211 may acquire the second data DATA2-1 from the first memory address of the memory 116, record it in the memory (not shown) of the network interface controller 211, for example, and then store it in at least one of the storage devices 212-1, 212-2 and 212-3. It is to be mentioned that the disclosure is not intent to limit the specific manner of how the second data DATA2-1 is distributed to at least one of the storage devices 212-1, 212-2 and 212-3 after being transmitted to the network interface controller 211, and those ordinarily skilled in the art may implement the manner based on demands.

Similarly, the network interface controller 221 and the network interface controller 231 may also acquire the second data DATA-2 and the second data DATA-3 from the second memory address and the third memory address.

According to the data transmission method introduced by the embodiment of the disclosure, the host system is capable of virtualizing the network interface controller as a virtual remote target device, thereby transmitting the first data to the plurality of physical remote target devices in one transmission via the NVMeoF technique.

Figure 5:
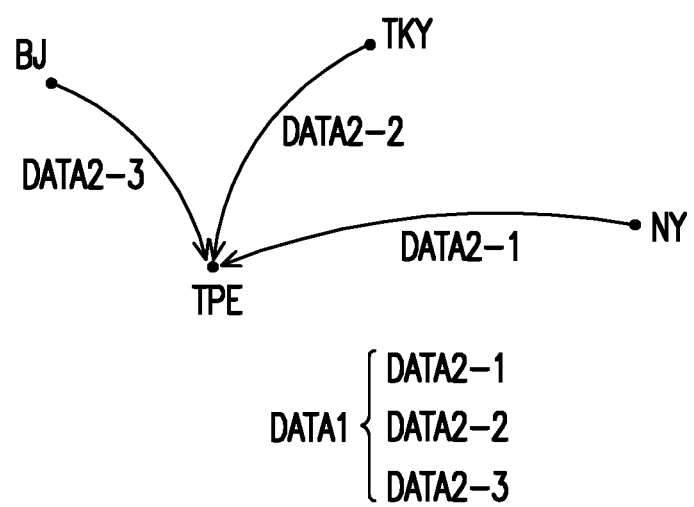
FIG. 5 is schematic diagrams illustrating an example that the host system transmits the first data to a plurality of physical remote target devices via the NVMeoF technique according to an embodiment of the disclosure.

FIG. 5 is schematic diagrams illustrating an example that the host system transmits the first data to a plurality of physical remote target devices via the NVMeoF technique according to an embodiment of the disclosure.

Referring to FIG. 5, when the host system 11 of the local end TPE is about to backup via the NVMeoF technique to transmit the first data DATA1 to the physical remote target devices of the plurality of remote destinations NY, TKY and BJ, by utilizing the data transmission method introduced by the embodiment of the disclosure, the host system 11 first virtualizes the network interface controller 111 as a virtual remote target device by using the programmable unit 115 disposed on the network interface controller 111, receives and transforms (for example, replicates or splits) the first data DATA1 into the plurality of second data DATA2-1, DATA2-2 and DATA2-3, records the plurality of second data DATA2-1, DATA2-2 and DATA2-3 in the memory 116 of the network interface controller 111, and then instructs each of the physical remote target devices of the remote destinations NY, TKY and BJ to acquire their second data DATA2-1, DATA2-2 and DATA2-3 from the memory 116. In this way, even though there are demands for data replication or remote backup in the environment in which the data is transmitted via the NVMeoF technique, the efficiency may still be maintained through the data transmission method of the embodiment of the disclosure.

Based on the above, in the data transmission method and the host system using the same provided by the embodiment of the disclosure, when the first data is to be transmitted to a plurality of physical remote target devices, the network interface controller of the host system is first virtualized as the virtual remote target device by using the programmable unit for receiving the first data to be transmitted, the first data is then replicated or split into the plurality of second data and the plurality of second data are recorded in the memory of the network interface controller, and then the plurality of physical remote target devices are instructed to acquire the plurality of second data respectively from the memory of the network interface controller. In this way, the data can be efficiently transmitted to a plurality of remote destinations.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A data transmission method, for transmitting first data to a plurality of physical remote target devices by a host system, the data transmission method comprising:
    generating a transmission instruction to transmit the first data to a network interface controller of the host system, wherein the transmission instruction is configured to transmit data to one single remote target device, wherein the remote target device comprises the physical remote target device or a virtual remote target device;
    transforming the first data into a plurality of second data and respectively recording the plurality of second data in a plurality of memory addresses of a memory of the network interface controller;
    instructing the plurality of physical remote target devices to acquire the plurality of second data respectively from the plurality of memory addresses of the memory, and
    wherein before the step of generating the transmission instruction to transmit the first data to the network interface controller of the host system, the data transmission method further comprises:
    virtualizing the network interface controller as the virtual remote target device.

2. The data transmission method according to claim 1, wherein the step of virtualizing the network interface controller as the virtual remote target device comprises:
    virtualizing the network interface controller as the virtual remote target device by a programmable unit on the network interface controller; and
    reporting by the programmable unit that the network interface controller is connected to one single remote target device.

3. The data transmission method according to claim 2, wherein the programmable unit is configured to set an amount of the plurality of second data.

4. The data transmission method according to claim 1, wherein the step of transforming the first data into the plurality of second data comprises:
    replicating the first data into the plurality of second data, such that each of the second data is identical to the first data.

5. The data transmission method according to claim 1, wherein the step of transforming the first data into the plurality of second data comprises:
    splitting the first data into the plurality of second data, wherein each of the second data is different from the first data.

6. The data transmission method according to claim 1, wherein the network interface controller supports a remote direct memory access (RDMA) technique.

7. The data transmission method according to claim 1, wherein the network interface controller is connected to the plurality of physical remote target devices through a network via a non-volatile memory express (NVMe) over Fabrics technique.

8. The data transmission method according to claim 1, wherein each of the remote target devices is an NVMe storage device.

9. A host system, for transmitting first data to a plurality of physical remote target devices, the host system, comprising:
   a network interface controller, connected to the plurality of physical remote target devices through a network and comprising a memory; and
   a processor, coupled to the network interface controller and configured to generate a transmission instruction to transmit the first data to the network interface controller, wherein the transmission instruction is configured to transmit data to one single remote target device, wherein the remote target device comprises the physical remote target device or a virtual remote target device;
   wherein the network interface controller is configured to:
      transform the first data into a plurality of second data and respectively record the plurality of second data in a plurality of memory addresses of the memory;
      instruct the plurality of physical remote target devices to acquire the plurality of second data respectively from the plurality of memory addresses of the memory, and
      be virtualized as the virtual remote target device.

10. The host system according to claim 9, wherein the network interface controller comprises:
   a programmable unit, configured to:
      virtualize the network interface controller as the virtual remote target device; and
      report to the processor that the network interface controller is connected to one single remote target device.

11. The host system according to claim 10, wherein the programmable unit is further configured to set an amount of the plurality of second data.

12. The host system according to claim 9, wherein the operation of the network interface controller transforming the first data into the plurality of second data comprises:
   replicating the first data into the plurality of second data, such that each of the second data is identical to the first data.

13. The host system according to claim 9, wherein the operation of the network interface controller transforming the first data into the plurality of second data comprises:
   splitting the first data into the plurality of second data, wherein each of the second data is different from the first data.

14. The host system according to claim 9, wherein the network interface controller supports an RDMA technique.

15. The host system according to claim 9, wherein the network interface controller is connected to the plurality of physical remote target devices through the network and via an NVMe over Fabrics technique.

16. The host system according to claim 9, wherein each of the remote target devices is an NVMe storage device.

* * * * *